(12) United States Patent
Meng et al.

(10) Patent No.: US 12,037,458 B2
(45) Date of Patent: Jul. 16, 2024

(54) PROCESS AND PREMIX FOR INCORPORATING OPTICAL BRIGHTENERS INTO A POLYMERIC COMPOSITION

(71) Applicant: Elkem Silicones USA Corp., East Brunswick, NJ (US)

(72) Inventors: Yan Meng, Rock Hill, SC (US); Michael John Watson, Fort Mill, SC (US); Chris Helt, Carpinteria, CA (US); Danaya Pratchayanan, Charlotte, NC (US); Amanda Burton, Gastonia, NC (US); Leeanne Brown, Chester, SC (US)

(73) Assignee: Elkem Silicones USA Corp., East Brunswick, NJ (US)

( * ) Notice: Subject to any disclaimer, the term of this patent is extended or adjusted under 35 U.S.C. 154(b) by 330 days.

(21) Appl. No.: 17/011,086

(22) Filed: Sep. 3, 2020

(65) Prior Publication Data
US 2021/0070945 A1 Mar. 11, 2021

Related U.S. Application Data

(60) Provisional application No. 62/896,982, filed on Sep. 6, 2019.

(51) Int. Cl.
*C08L 83/04* (2006.01)
*C08G 77/12* (2006.01)
*C08K 5/00* (2006.01)
*C08K 5/45* (2006.01)
*C09J 183/04* (2006.01)

(52) U.S. Cl.
CPC ............ *C08G 77/12* (2013.01); *C08K 5/0041* (2013.01); *C08K 5/45* (2013.01); *C08L 83/04* (2013.01); *C09J 183/04* (2013.01)

(58) Field of Classification Search
CPC ..... C07F 7/025; C08K 5/5435; C08K 5/5425; C08K 5/0041; C08L 83/04
USPC ......................................................... 528/15
See application file for complete search history.

(56) References Cited

U.S. PATENT DOCUMENTS

| | | | |
|---|---|---|---|
| 3,896,138 A * | 7/1975 | Kreider | C08J 9/28 521/147 |
| 6,086,795 A | 7/2000 | Hatton | |
| 2002/0034988 A1 | 3/2002 | Binette et al. | |
| 2007/0077216 A1* | 4/2007 | Dumousseaux | A61K 8/29 424/61 |
| 2011/0117174 A1 | 5/2011 | Kergosien et al. | |
| 2015/0376481 A1* | 12/2015 | Larson | C09J 133/14 524/506 |
| 2018/0030210 A1 | 2/2018 | Leistner et al. | |
| 2018/0355176 A1 | 12/2018 | Steinmann et al. | |
| 2021/0371551 A1* | 12/2021 | Zhang | C08K 5/5397 |

FOREIGN PATENT DOCUMENTS

| | | | |
|---|---|---|---|
| JP | H0598163 A | | 4/1993 |
| JP | 2016011329 A | | 1/2016 |
| JP | 2019143074 | * | 8/2019 |
| JP | 2019143074 A | | 8/2019 |
| WO | 2005/019343 A1 | | 3/2005 |
| WO | 2006/060189 A2 | | 6/2006 |
| WO | 2018/151450 A1 | | 8/2018 |

OTHER PUBLICATIONS

JP 2019 143074 machine translation (2019).*
International Search Report for Application No. PCT/US2020/049342 mailed Nov. 20, 2020.

* cited by examiner

*Primary Examiner* — Margaret G Moore
(74) *Attorney, Agent, or Firm* — McBee Moore & Vanik IP, LLC

(57) ABSTRACT

Methods for improving the dispersion of optical brighteners in polymeric compositions are provided. Polymeric compositions obtained by these methods are also provided. Premixes for use in the methods are also provided. In particular, methods for incorporating an optical brightener in a polymeric composition comprising dissolving the optical brightener in a solvent prior to adding the optical brightener to the polymeric compositions are provided.

13 Claims, 6 Drawing Sheets

A.

B.

C.

D.

E.

A.

B.

| Picture | % Tinopal OB | Average particle size (mm) |
|---|---|---|
|  | 0.25 | 0.010 |
|  | 0.50 | 0.024 |
|  | 1.00 | 0.072 |
|  | 2.00 | 0.056 |
|  | 3.00 | 0.058 |

A.

B.

A.

B.

A.

B.

PROCESS AND PREMIX FOR INCORPORATING OPTICAL BRIGHTENERS INTO A POLYMERIC COMPOSITION

CROSS-REFERENCE TO RELATED APPLICATIONS

This application claims priority to U.S. Provisional Patent Application No. 62/896,982, filed 6 Sep. 2019, the content of which is hereby incorporated by reference in its entirety.

FIELD OF THE INVENTION

The present invention relates to improved polymeric compositions and methods for incorporating an optical brightener into a polymeric composition.

BACKGROUND OF THE INVENTION

With the growing demand of automated optical inspection to ensure quality control in fields such as electronics, incorporation of an ultraviolet (UV) tracer into functional polymeric compositions, such as potting, adhesive, gasketing, sealants, coating, and encapsulating materials, is useful to facilitate the detection of leakage and mis-positioning of polymeric materials during dispensing. In other fields, such as textile coating, and with primers, such as Novoprime®, UV traceability is a good way to check if the coating or primer has been uniformly applied on the substrate.

Several UV tracers, also known as optical brighteners or fluorescent dyes, are known in the art. Benzoxazole derivatives, stilbene derivatives, coumarins, naphthalimides, and 1,3,5-triazin-2-yl derivatives are among the most widely-used classes of UV tracers. In particular, 2,5-thiophenediyl-bis(5-tert-butyl-1,3-benzoxazole) is a widely-used benzoxazole-derived UV tracer sold under commercial names such as Tinopal® OB CO, Benetex® OB, Benetex® OB Plus, or Uvitex® OB.

BASF (U.S. Pat. No. 6,086,795) describes the use of light-emitting material, such as 2,5-thiophenediylbis(5-tert-butyl-1,3-benzoxazole), in adhesive materials including photocurable silicone adhesives.

Top-Flite (US 2002/0034988) describes that optical brighteners, such as 2,5-thiophenediylbis(5-tert-butyl-1,3-benzoxazole), can be included in the cover layer of golf balls, which can comprise at least 0.1% by weight of high-viscosity siloxane polymer.

Dow Corning (WO 2005/019343) describes the use of pigments, including UV-active dyes such as 2,5-thiophenediylbis(5-tert-butyl-1,3-benzoxazole), in a silicone composition comprising fluoro-organosiloxane.

Henkel (WO 2006/060189) describes inclusion of a fluorescent agent, such as 2,5-thiophenediylbis(5-tert-butyl-1,3-benzoxazole), in photo-curable silicone compositions.

L'Oréal SA (US 2011/0117174) describes that special effects additives, such as 2,5-thiophenediylbis(5-tert-butyl-1,3-benzoxazole), can be included in the polymer layer of the article, which can be comprised of silicone polymers.

Dow Silicones (WO 2018/151450) describes 2,5-thiophenediylbis(5-tert-butyl-1,3-benzoxazole) as an optional optical brightener to be added to the room-temperature, moisture-curable silicone compositions.

While the above patent documents generally describe inclusion of optical brighteners, such as benzoxazole derivatives, in various polymeric compositions, none of these documents disclose methods for dispersing the optical brightener into the polymeric composition. Due to the low solubility of some optical brighteners, including 2,5-thiophenediylbis(5-tert-butyl-1,3-benzoxazole), in polymers, Applicants have found that these optical brighteners exist in the polymeric composition as micron-sized particles, which not only affects the appearance of the material, but also may cause the nozzle to clog during dispensing for certain applications.

Thus, there exists a need to provide polymeric compositions, such as silicone compositions, containing optical brightener(s), in which the optical brightener is homogeneously distributed in the composition and does not exist as particles. This invention provides a new process of incorporating an optical brightener into a polymeric composition to solve the above problems. This invention also provides polymeric compositions comprising an optical brightener having excellent adhesive properties and minimal to no sedimentation.

BRIEF SUMMARY OF THE INVENTION

As a result of diligent research, the inventors of the present invention found that it was possible to solve the above-mentioned problems by dissolving optical brightener in a solvent prior to adding the optical brightener in a polymeric composition.

In some embodiments, a premix blend is provided comprising at least one optical brightener and at least one compound that is able to dissolve the at least one optical brightener (i.e., a solvent).

In some embodiments, the premix blend comprises at least one polyalkoxy-silicon compound as a solvent, and at least one optical brightener, wherein the at least one optical brightener is a benzoxazole derivative.

In some embodiments, the premix blend comprises 100 parts by weight of the at least one polyalkoxy-silicon compound, and from 0.0001 to 10 parts by weight of the at least one optical brightener.

In some embodiments, the at least one polyalkoxy-silicon compound has the following formula (3):

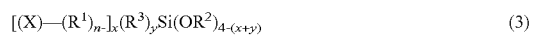

$$[(X)-(R^1)_{n-}]_x(R^3)_y Si(OR^2)_{4-(x+y)} \quad (3)$$

in which:
x=0, 1 or 2; preferably x=0 or 1;
y=0 or 1;
x+y=0, 1 or 2;
n=0 or 1;
$R^1$ is a linear or branched or cyclic alkylene group having 1 to 20 carbon atoms; optionally with aromatic fractions; optionally with one or more heteroatoms;
$R^2$ is an alkyl group having 1 to 5 carbon atoms;
X is a hydrogen atom or a functional group selected from the group consisting of oxirane, OH, (meth)acryloyloxy, amine, SH, acylthio, and vinyl; and
$R^3$ is selected from the group consisting of: an alkyl group having 1 to 8 carbon atoms, a mercaptoalkyl group, a $C_1$ to $C_6$ haloalkyl group, an ureidoalkyl group, a $C_2$ to $C_8$ alkenyl group, a substituted or unsubstituted aryl group, and a $C_1$ to $C_8$ alkyl comprising (meth)acrylate group.

In some embodiments, the at least one polyalkoxy-silicon compound is selected from the group consisting of glycidyl 3-(trimethoxysilyl)propyl ether (GLYMO), 3-glycidyloxy-propyltriethoxysilane; vinyltrimethoxysilane (VTMO), vinyltriethoxysilane, vinyltriacetoxysilane, octyltrimethoxysilane, dodecyltrimethoxysilane, hexadecyltrimethoxysilane, methyloctyldimethoxysilane, 3-methacryloxypropyltrimethoxysilane (MEMO), 3-meth-acryloyloxypropyltriethoxysilane, n-octyltrimethoxysilane, dodecyltrimethoxysilane, hexadecyltrimethoxysilane, methyloctyldimethoxysilane, methyltrimethoxysilane, methyltriethoxysilane, dimethyldimethoxysilane, propyltrimethoxysilane, isobutyltrimethoxysilane, phenyltrimethoxysilane, and their mixtures.

In some embodiments, the at least one polyalkoxy-silicon compound is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures.

In some embodiments, the at least one optical brightener has the following formula (2):

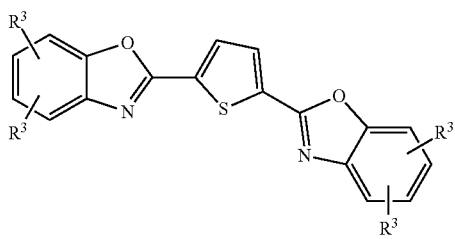

(2)

in which $R^3$, independently, is a hydrogen atom, —$C(CH_3)_3$, a $C_1$ to $C_{30}$ alkyl group, or —$CO(O—R^4)$ in which $R^4$ is a $C_1$ to $C_{30}$ alkyl group.

In some embodiments, the at least one optical brightener has the following formula (3):

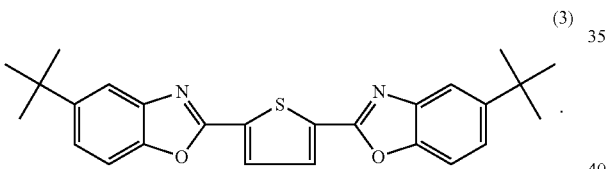

(3)

A process for incorporating an optical brightener into a polymeric composition is also provided comprising a) mixing at least one optical brightener and at least one solvent to create a premix blend; and b) adding the premix blend to the polymeric composition.

In some embodiments, the at least one optical brightener is a benzoxazole derivative, and the at least one solvent is a polyalkoxy-silicon compound.

In some embodiments, the at least one optical brightener is a bis(benzoxazole) derivative(s). In some embodiments, the at least one optical brightener is a bis(benzoxazole) derivative selected from the group consisting of 2,5-thiophenediylbis(5-tert-butyl-1,3-benzoxazole) (Tinopal® OB CO), 2,2'-(vinylenedi-p-phenylene)bisbenzoxazole, 2,2'-(naphthalene-1,4-diyl)bis(benzoxazole), 2-[4-[2-[4-(benzoxazol-2-yl)phenyl]vinyl]phenyl]-5-methylbenzoxazole, and stilbene-benzoxazolines, such as 2,2'-(1,2-ethenediyl)bis(4,1-phenylene)bisbenzoxazole.

In some embodiments, the polyalkoxy-silicon compound is selected from the group consisting of glycidyl 3-(trimethoxysilyl)propyl ether (GLYMO), 3-glycidyloxypropyltriethoxysilane; vinyltrimethoxysilane (VTMO), vinyltriethoxysilane, vinyltriacetoxysilane, octyltrimethoxysilane, dodecyltrimethoxysilane, hexadecyltrimethoxysilane, methyloctyldimethoxysilane, 3-methacryloxypropyltrimethoxysilane (MEMO), 3-meth-acryloyloxypropyltriethoxysilane, n-octyltrimethoxysilane, dodecyltrimethoxysilane, hexadecyltrimethoxysilane, methyloctyldimethoxysilane, methyltrimethoxysilane, methyltriethoxysilane, dimethyldimethoxysilane, propyltrimethoxysilane, isobutyltrimethoxysilane, phenyltrimethoxysilane, and their mixtures. In some embodiments, the polyalkoxy-silicon compound is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures.

Polymeric compositions comprising a premix blend and/or obtained by the process described above are also provided. Suitable polymeric compositions include polymers as at least one component chosen from homopolymer or block or statistical copolymers, which include, but are not limited to, silicones, epoxy, epoxy copolymers, polyurethanes, acrylic polymers and copolymers, butyl rubbers, ethylene-vinyl acetate polymers, polyamides, polyester, and polyether.

In some embodiments, the polymeric compositions are silicones. In some embodiments, the polymeric composition is an addition curable organopolysiloxane composition. In particular, polymeric compositions, such as an addition curable organopolysiloxane, having excellent adhesive properties and/or minimal to no sedimentation are provided. Such polymeric compositions can be particularly useful as sealants and/or coatings in fields such as electronics and computers.

In some embodiments, an addition curable organopolysiloxane composition X is provided comprising:
  a) at least one organopolysiloxane A having at least two alkenyl groups bonded to silicon per molecule, said alkenyl groups each containing from 2 to 14 carbon atoms,
  b) at least one silicon compound B having at least two hydrogen atoms bonded to silicon per molecule,
  c) at least one addition reaction catalyst C, and
  d) at least one optical brightener E dissolved in at least one solvent D.

In some embodiments, the at least one solvent D is a polyalkoxy-silicon, and/or the at least one optical brightener E is a benzoxazole derivative.

In some embodiments, the at least one optical brightener E dissolved in at least one solvent D is a premix blend comprising:
  a) at least one polyalkoxy-silicon compound, and
  b) at least one optical brightener E, wherein the at least one optical brightener E is a benzoxazole derivative.

In some embodiments, each of said alkenyl groups of the at least one organopolysiloxane A in the addition curable organopolysiloxane composition X are independently chosen from the group consisting of vinyl, allyl, hexenyl, decenyl and tetradecenyl. Preferably, each of said alkenyl groups of the at least one organopolysiloxane A are vinyl.

In some embodiments, the at least one silicon compound B in the addition curable organopolysiloxane composition X has at least three hydrogen atoms bonded to silicon per molecule.

In some embodiments, the at least one addition reaction catalyst C is a platinum group metal-containing catalyst.

In some embodiments, the addition curable organopolysiloxane composition X further comprises one or more of the following components:
  e) at least one cure rate modifier F,
  f) at least one filler G,
  g) at least one silicone resin H, and/or
  h) at least one additive I.

Also provided is a cured organopolysiloxane composition obtained by curing the addition curable organopolysiloxane composition X described above.

Also provided is a potting, adhesive, gasketing, sealant, coating, and/or encapsulating composition comprising the polymeric compositions described herein.

Use of the polymeric compositions described herein in a computer or an electronic device, in a functional polymeric composition such as potting, adhesive, gasketing, sealant, coating, and/or encapsulating materials, for the detection of leakage and mis-positioning of polymeric materials during dispensing is also provided.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Figure 1A:
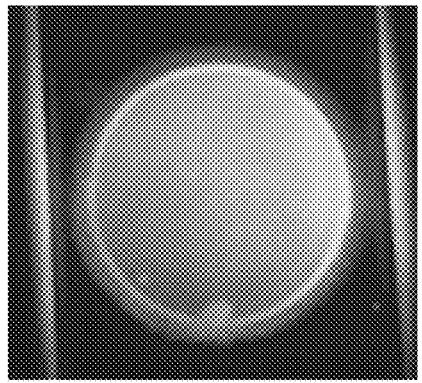
FIG. 1A-1E shows photographic images of Tinopal® OB CO (2,5-thiophenediylbis(5-tert-butyl-1,3-benzoxazole)) mixed with various silanes and/or titanate under black light. A. Tinopal® OB CO+a mixture of silanes enriched in glycidyloxypropyl groups (Mixture A). B. Tinopal® OB CO+TnBT (tetrabutyl titanate). C. Tinopal® OB CO+VTMO (vinyltrimethoxysilane). D. Tinopal® OB CO+GLYMO (glycidyl 3-(trimethoxysilyl)propyl ether). E. Tinopal® OB CO+cocktail of GLYMO+VTMO+TBT (2%+2%+0.7% by weight, respectively).

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "silicone rubber" includes the crosslinked product of any crosslinkable silicone composition. The terms "silicone rubber" and "silicone elastomer" may be used interchangeably.

As used herein, the terms "crosslinked" and "cured" may be used interchangeably and refer to the reaction that occurs when the two-part system is combined and allowed to react, resulting in the cured silicone elastomer.

As used herein, the term "alkenyl" is understood to mean an unsaturated, linear or branched hydrocarbon chain, substituted or not, having at least one olefinic double bond, and more preferably a single double bond. Preferably, the "alkenyl" group has 2 to 8 carbon atoms and better still 2 to 6. This hydrocarbon chain optionally includes at least one heteroatom such as O, N, S. Preferred examples of "alkenyl" groups are vinyl, allyl and homoallyl groups, vinyl being particularly preferred.

As used herein, "alkyl" denotes a saturated, linear or branched hydrocarbon chain, possibly substituted (e.g. with one or more alkyls), with preferably 1 to 30 carbon atoms, for example 1 to 10 carbon atoms. Examples of alkyl groups are notably methyl, ethyl, isopropyl, n-propyl, tert-butyl, isobutyl, n-butyl, n-pentyl, isoamyl and 1,1-dimethylpropyl.

As used herein, the term "derivative" is defined as a compound that can be imagined to arise or actually be synthesized from a parent compound by replacement of one or more atoms with another atom or group of atoms.

As used herein, the term "homogenous distribution" is defined as even dispersion of a compound (such as an optical brightener) within a composition (such as a polymeric composition). For example, homogenous distribution of a compound within a composition can be defined as an absence of agglomerates or particles or the like of the compound within the composition. Homogenous distribution of a compound (such as an optical brightener) within a composition can be determined by any suitable means. For example, homogenous distribution of an optical brightener within a composition can be determined visually by exposing the composition to the appropriate UV wavelength and examining the composition by the naked eye or under any suitable magnification. In some cases, absence of visual particles or agglomerates or the like is indicative of homogenous distribution. In some cases, the absence of visible particles or agglomerates or the like larger than 50-60 µm is indicative of homogenous distribution. In some cases, the absence of visible particles or agglomerates or the like under up to 6× magnification is indicative of homogenous distribution. Homogenous distribution of a compound (such as an optical brightener) within a composition can also be determined by measuring the extrusion rate of the composition.

Pre-Mix Blend of Optical Brightener and Solvent

To achieve the objective of distributing optical brighteners homogeneously in polymeric compositions, the inventors of the present invention found that it was possible to achieve this objective by first dissolving the optical brightener in a solvent to result in a premix blend. This premix blend can be added to polymers to result in polymeric compositions with improved properties, such as, for example, homogenous distribution of optical brightener in the compositions, lack of visible particles of optical brightener within the compositions, and/or improved dispensing of compositions in certain applications in which micron-sized particle could clog nozzles. Importantly, the solvents used to dissolve the optical brighteners described by the invention do not impart negative effects, such as altered adhesive properties, on the resulting polymeric compositions.

The premix blend of the invention comprises at least one optical brightener and at least one solvent. In some embodiments, the premix blend of the invention consists essentially of at least one optical brightener and at least one solvent. In some embodiments, the premix blend of the invention consists of at least one optical brightener and at least one solvent.

As used herein, the term solvent refers to any compound or mixture of compounds capable of dissolving an optical brightener. In some embodiments, a solvent is a compound or mixture of compounds that, upon combination with an optical brightener, forms a clear solution in which no visible particles of the optical brightener can be detected by human eye at up to and including six times (6×) magnification. For example, a solvent may be any compound or mixture of compounds that, upon combination with an optical brightener, forms a clear solution in which no visible particles of the optical brightener can be detected by human eye without magnification, at 1.5× magnification, at 2× magnification, at 2.5× magnification, at 3× magnification, at 4× magnification, at 5× magnification, and/or at 6× magnification.

The at least one optical brightener may be included in the premix blend in any suitable amount. The amount of the at least one solvent included in the premix blend may be any amount suitable to dissolve the at least one optical brightener.

In some embodiments, the premix blend includes 100 parts by weight of the at least one solvent, and from 0.0001 to 10 parts by weight of the at least one optical brightener. In some embodiments, the premix blend includes 100 parts by weight of the at least one solvent, and from 0.0001 to 10 parts by weight of the at least one optical brightener. In some embodiments, the premix blend includes 100 parts by weight of the at least one solvent, and from 0.0001 to 10 parts by weight of the at least one optical brightener.

The premix blend may be prepared by any suitable means at any suitable temperature. In some embodiments, the premix blend is prepared by mixing the at least one optical brightener and the at least one solvent at room temperature. In some embodiments, the premix blend is prepared by mixing the at least one optical brightener and the at least one solvent at about 50° C. In some embodiments, the premix blend is prepared by mixing the at least one optical brightener and the at least one solvent under nitrogen and heating at about 50° C. with stirring.

The premix blend may be stirred for any amount of time sufficient to substantially or completely dissolve the at least one optical brightener in the at least one solvent. It has been advantageously demonstrated that the optical brightener can be dissolved in solvent within about 10 minutes or less, within about 5 minutes or less, or within about 3 minutes or less. In some embodiments, the at least one optical brightener and the at least one solvent are mixed for between about 30 seconds and about 10 minutes. In some embodiments, the at least one optical brightener and the at least one solvent are mixed for between about 2 and about 8 minutes. In some embodiments, the at least one optical brightener and the at least one solvent are mixed for between about 3 minutes and about 6 minutes.

Average particle size of the at least one optical brightener within the premix blend will vary depending on the optical brightener used. In some embodiments, the average particle size of the the at least one optical brightener within the premix blend is about 60 µm or less, preferably about 50 µm or less, more preferable about 30 µm or less. In some embodiments, the average particle size of the the at least one optical brightener within the premix blend is from about 1 µm to about 60 µm; preferably from about 5 µm to about 50 µm; more preferably from about 10 µm to about 25 µm.

Optical Brighteners

Optical brighteners, also known as UV tracers, optical brightening agents (OBA), optical whiteners, fluorescent brighteners, fluorescent brightening agents, fluorescent optical brighteners, fluorescent whitening agents (FWA), fluorescent white dyes, and organic fluorescent dyes, is a generic term covering a range of compounds. The terms optical brighteners, OBAs, and UV tracers are used interchangeably herein.

Optical brighteners can be defined as compounds that absorb in the ultraviolet (UV) wavelength range between 300 and 390 nm and reemit in the wavelength range between 400 and 525 nm. Optical brighteners may be categorized according to their chemical structure. Common optical brighteners include the derivatives of stilbene, in particular the polystyrylstilbenes and the triazinestilbenes, the coumarin derivatives, in particular the hydroxycoumarins and the aminocoumarins, the oxazole, benzoxazole such as the thiophenediyl benzoxazoles, triazole, imidazole, and pyrazoline derivatives, the pyrene derivatives and the porphyrin derivatives and mixtures thereof. Basic classes of compounds used as optical brighteners include several structures as given in Table 1.

include, but are not limited to, stilbene derivatives such as hexasodium-2,2'-[vinylbis[3-sulfonato-4,1-phenylene]imino[6-(diethylamino)-1,3,5-triazine-4,2-diyl]imino]]bis(benzene-1,4-disulphonate), which is commercially avail-

TABLE 1

Typical optical brighteners and their type (anionic, neutral, or cationic)

| OBA-type | Structure | Type (anionic, neutral, or cationic) |
|---|---|---|
| Triazine-stilbenes (di-, tetra-, or hexa-sulfonated) | | Anionic |
| Biphenyl-stilbenes | | Anionic |
| Benzoxazolines | | Neutral |
| Coumarins | | Neutral |
| Imidazolines | | Cationic |
| Diazoles | | Neutral |
| Triazoles | | Neutral |

In some embodiments of the invention, any known optical brightener can be used in the premix blend. In some embodiments, the at least one optical brightener is selected from one or more stilbene or benzoxazole derivative(s).

Examples of stilbene derivatives that may be used as optical brighteners in the premix blend of the invention able under the trade name Tinopal® SFP from BASF; stilbene-benzoxazolines, such as 2,2'-(1,2-ethenediyl)bis(4,1-phenylene)bisbenzoxazole, which is commercially available under the trade name Benetex® OB-1 HP from Mayzo; and biphenyl-stilbenes, such as benzenesulfonic acid, 2,2'-([1,1'-biphenyl]-4,4'-diyldi-2,1-ethenediyl)bis-, which is commercially available under the trade name Benetex® OB-M1 from Mayzo.

In some embodiments, the at least one optical brightener used in the premix blend of the invention is one or more benzoxazole derivative(s). Benzoxazole derivatives for use as optical brighteners are described, for example, in U.S. Pat. No. 3,674,781. In some embodiments, a benzoxazole derivative is a compound which corresponds to the general formula

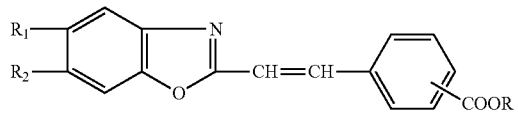

(1)

in which R represents hydrogen, an alkyl group of one to four carbon atoms, cyclohexyl, halo lower alkyl, hydroxyethyl, lower alkoxy lower alkyl, di-(lower alkyl)-amino lower alkyl, tri-(lower alkyl)-ammonium lower alkyl, phenyl and phenyl lower alkyl; $R_1$ can be selected from hydrogen, lower alkyl or halogen; $R_2$ can be selected from lower alkyl; and $R_1$ and $R_2$ taken together represent —$(CH_2)_3$— or —$(CH_2)_4$—.

In some embodiments, the at least one optical brightener is one or more bis(benzoxazole) derivative(s). In some embodiments, a bis(benzoxazole) derivative having the structure of formula (2) is used in the premix blend of the invention:

(2)

in which $R^3$, independently, is a hydrogen atom, —$C(CH_3)_3$, a $C_1$ to $C_{30}$ alkyl group, or —$CO(O$—$R^4)$ in which $R^4$ is a $C_1$ to $C_{30}$ alkyl group.

Examples of benzoxazole derivatives that may be used as optical brighteners in the premix blend of the invention include, but are not limited to, 2,5-thiophenediylbis(5-tert-butyl-1,3-benzoxazole), which is commercially available under the trade name Tinopal® OB CO from BASF, 2,2'-(vinylenedi-p-phenylene)bisbenzoxazole, 2,2'-(naphthalene-1,4-diyl)bis(benzoxazole), 2-[4-[2-[4-(benzoxazol-2-yl)phenyl]vinyl]phenyl]-5-methylbenzoxazole, and stilbene-benzoxazolines, such as 2,2'-(1,2-ethenediyl)bis(4,1-phenylene)bisbenzoxazole, which is commercially available under the trade name Benetex® OB-1 HP from Mayzo.

Preferably, the at least one optical brightener used in the premix blend of the invention is 2,5-thiophenediylbis(5-tert-butyl-1,3-benzoxazole) or a derivative thereof. In some embodiments, the at least one optical brightener used in the premix blend of the invention has the structure of formula (3):

(3)

There is no limitation on the amount of optical brightener(s) included in the premix blend of the invention. Any amount of optical brightener(s) suitable to impart the advantageous properties of UV traceability of the polymeric composition can be used in the premix blend. In some embodiments, the amount of optical brightener(s) included in the premix blend is determined such that the amount of optical brightener(s) present in the total composition is from about 0.001% to about 0.02% by weight.

Solvents

The inventors of present invention have surprisingly found that by mixing one or more of the above-described optical brighteners with a solvent before incorporating the optical brightener into polymeric compositions, it is possible to achieve homogenous distribution of the optical brightener without compromising the desired properties of the polymeric compositions.

Any compound or mixture of compounds capable of dissolving an optical brightener can be used. In some embodiments, the solvent is a compound or mixture of compounds that, upon combination with an optical brightener, forms a clear solution in which no visible particles of the optical brightener can be detected by human eye at up to and including six times (6×) magnification. For example, a solvent may be any compound or mixture of compounds that, upon combination with an optical brightener, forms a clear solution in which no visible particles of the optical brightener can be detected by human eye without magnification, at 1.5× magnification, at 2× magnification, at 2.5× magnification, at 3× magnification, at 4× magnification, at 5× magnification, and/or at 6× magnification.

Suitable solvents include, but are not limited to, alkoxysilanes, such as polyalkoxysilanes.

In some embodiments, the at least one solvent used in the premix blend of the invention is a polyalkoxy-silicon compound having the structure of formula (4):

$$[(X)-(R^1)_{n\text{-}}]_x(R^3)_y Si(OR^2)_{4-(x+y)}$$ (4)

in which:
x=0, 1 or 2, preferably x=0 or 1;
y=0 or 1;
x+y=0, 1 or 2;
n=0 or 1;
$R^1$ is a linear or branched or cyclic alkylene group having 1 to 20 carbon atoms, optionally with aromatic fractions, optionally with one or more heteroatoms;
$R^2$ is an alkyl group having 1 to 5 carbon atoms;
X is a hydrogen atom or a functional group selected from the group consisting of oxirane, OH, (meth)acryloyloxy, amine, SH, acylthio, and vinyl; and
$R^3$ is selected from the group consisting of: an alkyl group having 1 to 8 carbon atoms, a mercaptoalkyl group, a $C_1$ to $C_6$ haloalkyl group, an ureidoalkyl group, a $C_2$ to $C_8$ alkenyl group, a substituted or unsubstituted aryl group, and a $C_1$ to $C_8$ alkyl comprising (meth)acrylate group.

In some embodiments, the at least one solvent is a polyalkoxy-silicon compound selected from the group consisting of glycidyl 3-(trimethoxysilyl)propyl ether (GLYMO), 3-glycidyloxy-propyltriethoxysilane; vinyltrimethoxysilane (VTMO), vinyltriethoxysilane, vinyltriacetoxysilane, octyltrimethoxysilane, dodecyltrimethoxysilane, hexadecyltrimethoxysilane, methyloctyldimethoxysilane, 3-methacryloxypropyltrimethoxysilane (MEMO), 3-meth-acryloyloxypropyltriethoxysilane, n-octyltrimethoxysilane, dodecyltrimethoxysilane, hexadecyltrimethoxysilane, methyloctyldimethoxysilane, methyltrimethoxysilane, methyltriethoxysilane, dimethyldimethoxysilane, propyltrimethoxysilane, isobutyltrimethoxysilane, phenyltrimethoxysilane, and their mixtures. In some embodiments, the polyalkoxy-silicon compound is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures. In some embodiments, the at least one solvent is glycidyl 3-(trimethoxysilyl)propyl ether (GLYMO) or a derivative thereof.

There is no limitation on the amount of solvent included in the premix blend of the invention. Any amount of solvent suitable to dissolve the at least one optical brightener can be used in the premix blend. In some embodiments, the at least one optical brightener is present in an amount from about 0.1% to about 1.0% by weight of the premix blend.

Polymeric Compositions

Polymeric compositions comprising the premix blend of the invention are also provided.

Suitable polymeric compositions include polymers as at least one component chosen from homopolymer or block or statistical copolymers, which include, but are not limited to, silicones, epoxy, epoxy copolymers, polyurethanes, acrylic polymers and copolymers, butyl rubbers, ethylene-vinyl acetate polymers, polyamides, polyester, and polyether.

Preferably, the polymeric compositions of the invention are silicones.

More preferably, the polymeric composition of the invention is an addition curable organopolysiloxane composition X.

In particular, polymeric compositions, such as an addition curable organopolysiloxane X, having excellent adhesive properties and/or minimal to no sedimentation are provided. For example, the polymeric compositions may have one or more of the following properties: anti-sedimentation, faster building-up of adhesion, maintenance of adhesion of wet materials after storage. Such polymeric compositions can be particularly useful as sealants and/or coatings in fields such as electronics and computers.

In some embodiments, an addition curable organopolysiloxane composition X is provided comprising the following components:
(A) at least one organopolysiloxane A having at least two alkenyl groups bonded to silicon per molecule, said alkenyl groups each containing from 2 to 14 carbon atoms,
(B) at least one silicon compound B having at least two hydrogen atoms bonded to silicon per molecule,
(C) at least one addition reaction catalyst C,
(D) at least one optical brightener E dissolved in at least one solvent D,
(E) optionally, at least one cure rate modifier F,
(F) optionally, at least one filler G,
(G) optionally, at least one silicone resin H, and/or
(H) optionally, at least one additive I.

The addition curable organopolysiloxane composition X may be provided as a two-part curable system. In some embodiments, the addition curable organopolysiloxane composition comprises a first composition comprising components (A) and (C), but not (B) and not (D) and a second composition comprising components (B) and (D), but not (A) and not (C). In some embodiments, the first composition has a viscosity of from about 10,000 to about 40,000 mPa·s and the second composition has a viscosity of from about 20,000 to about 60,000 mPa·s. In some embodiments, the first composition has a viscosity of from about 10,000 to about 25,000 mPa·s and the second composition has a viscosity of from about 20,000 to about 40,000 mPa·s. In some embodiments, the first composition has a viscosity of from about 15,000 to about 20,000 mPa·s and the second composition has a viscosity of from about 25,000 to about 35,000 mPa·s. In some embodiments, the first composition has a viscosity of from about 15,000 to about 25,000 mPa·s and the second composition has a viscosity of from about 25,000 to about 32,500 mPa·s.

In some embodiments, each of said alkenyl groups of the at least one organopolysiloxane A are independently chosen from the group consisting of vinyl, allyl, hexenyl, decenyl and tetradecenyl. Preferably, each of said alkenyl groups of the at least one organopolysiloxane A are vinyl.

Viscosity of the at least one organopolysiloxane A may vary depending on the desired properties of the cured organopolysiloxane obtained by curing the addition curable organopolysiloxane composition X. In some embodiments, the viscosity of the at least one organopolysiloxane A is between about 1,000 mPa·s and about 100,000 mPa·s. In some embodiments, the viscosity of the at least one organopolysiloxane A is between about 5,000 mPa·s and about 50,000 mPa·s. In some embodiments, the viscosity of the at least one organopolysiloxane A is between about 7,500 mPa·s and about 25,000 mPa·s.

In some embodiments, the addition curable organopolysiloxane composition X comprises more than one organopolysiloxane A. In some embodiments, the addition curable organopolysiloxane composition X comprises at least one organopolysiloxane A1 having a viscosity between about 1,000 to about 10,000 mPa·s and at least one organopolysiloxane A2 having a viscosity between about 5,000 mPa·s and about 50,000 mPa·s. In some embodiments, the addition curable organopolysiloxane composition X comprises at least one organopolysiloxane A1 having a viscosity between about 2,500 to about 7,500 mPa·s and at least one organopolysiloxane A2 having a viscosity between about 7,500 mPa·s and about 25,000 mPa·s.

Component (B) can be any silicon compound B having at least two hydrogen atoms bonded to silicon per molecule. Component (B) functions as a crosslinker of the addition curable organopolysiloxane composition X. Component (B) can also be a mixture of two or more silicon compounds B having at least two hydrogen atoms bonded to silicon per molecule. In some embodiments, the at least one silicon compound B has at least three hydrogen atoms bonded to silicon per molecule. In some embodiments, the at least one silicon compound B is a dimethylhydrosiloxy-terminated poly(dimethylsiloxy)(methylhydrosiloxy) copolymer. In some embodiments, the average hydrogen content of the at least one silicon compound B is about 0.69% by weight.

The molecular weight of the at least one silicon compound B may vary from about $10^2$ to about $10^6$ g/mol. In some embodiments, the molecular weight of the at least one silicon compound B is between about 100 to 30,000 g/mol.

In some embodiments, the viscosity of the at least one silicon compound B is between about 1 mPa·s and about 2,000 mPa·s.

The at least one silicon compound B can be included in an amount from 1 to 30 parts by weight per 100 parts by weight of the at least one alkenyl group-containing organopolysiloxane A. In some embodiments, the at least one silicon compound B can be included in an amount from 5 to 20 parts by weight per 100 parts by weight of the at least one alkenyl group-containing organopolysiloxane A. In some embodiments, the at least one silicon compound B can be included in an amount from 10 to 15 parts by weight per 100 parts by weight of the at least one alkenyl group-containing organopolysiloxane A.

Catalysts

The at least one addition reaction catalyst C can be included in the addition curable organopolysiloxane composition X at any amount capable of curing the composition. For example, the addition reaction catalyst C can be included at an amount where the quantity of a platinum group metal in catalyst C is from 0.01 to 1000 parts per weight per 1,000,000 parts by weight of the alkenyl group-containing organopolysiloxane A.

The catalyst C may notably be chosen from compounds of platinum and rhodium. It is possible, in particular, to use platinum complexes and an organic product described in U.S. Pat. Nos. 3,159,601, 3,159,602, 3,220,972 and European patents EP-A-0 057 459, EP-A-0 118 978 and EP-A-0 190 530, complexes of platinum and vinylorganosiloxanes described in U.S. Pat. Nos. 3,419,593, 3,715,334, 3,377,432 and 3,814,730. In some embodiments, the addition reaction catalyst C is a platinum group metal-containing catalyst.

Component (D)

The at least one optical brightener E is mixed with at least one solvent D prior to adding to the addition curable organopolysiloxane composition X. The inventors have surprisingly discovered that by mixing the at least one optical brightener E with at least one solvent D prior to adding the at least one optical brightener E to the addition curable organopolysiloxane composition X, it is possible to obtain homogenous distribution of the at least one optical brightener E within the composition X. The at least one optical brightener E and at least one solvent D used for component (D) can be any optical brightener or solvent described herein.

Component (D) can advantageously be the premix blend described above. The premix blend of the invention can be included in the addition curable organopolysiloxane composition X in any amount suitable to impart the advantageous properties of UV traceability. Thus, there is no limitation on the amount of the at least one optical brightener E included in the addition curable organopolysiloxane composition X. However, in some embodiments, the amount of optical brightener E included in the addition curable organopolysiloxane composition X is from about 0.001% to about 0.02% by weight of the total weight of the composition X; from about 0.0025% to about 0.015% by weight of the total weight of the composition X; or from about 0.005% to about 0.01% by weight of the total weight of the composition X.

Similarly, there is no limitation on the amount of the at least one solvent D used in the addition curable organopolysiloxane composition X. In some embodiments, the amount of the at least one solvent D present in the addition curable organopolysiloxane composition X is from about 0.5% to about 5.0% wt. of the total weight of the composition X; preferably the amount of the at least one solvent D present in the addition curable organopolysiloxane composition X is from about 0.75% wt. to about 3.0% of the total weight of the composition X; more preferably the amount of the at least one solvent D present in the addition curable organopolysiloxane composition X is from about 1.0% wt. to about 2.5% of the total weight of the composition X. In some embodiments, the amount of the at least one solvent D present in the addition curable organopolysiloxane composition X is about 1.0% wt. or less of the total weight of the composition X.

Cure Rate Modifiers

In some embodiments, the addition curable organopolysiloxane composition X further comprises at least one cure rate modifier F. The cure rate modifier F may be a crosslinking inhibitor and/or a crosslinking retardant, for example.

Crosslinking inhibitors are well known. Examples of crosslinking inhibitors that may be used as the cure rate modifier F include, but are not limited to:
polyorganosiloxanes, advantageously cyclic and substituted by at least one alkenyl group, tetramethylvinyltetrasiloxane being particularly preferred,
pyridine,
phosphine and organic phosphites,
unsaturated amides,
alkylated maleates,
acetylenic alcohols.

These acetylenic alcohols (cf. FR-B-1 528 464 and FR-A-2 372 874), which form part of the preferred thermal blockers of the hydrosilylation reaction, have the formula:

in which:
R is a linear or branched alkyl radical, or a phenyl radical;
R' is H or a linear or branched alkyl radical, or phenyl radical;
the radicals R, R' and the carbon atom situated in the alpha position of the triple bond being possibly able to form a ring;
the total number of carbon atoms contained in R and R' being at least 5, preferably 9 to 20.

Said alcohols are preferably chosen from those having a boiling point about 250° C. As examples, mention may be made of:
1-ethynyl-1-cyclohexanol (ECH);
methyl-3 dodecyne-1 ol-3;
trimethyl-3,7,11 dodecyne-1 ol-3;
diphenyl-1,1 propyne-2 ol-1
ethyl-3 ethyl-6 nonyne ol-3;
methyl-3 pentadecyne-1 ol-3.

These alpha-acetylenic alcohols are commercial products.

Such a regulator is present at a maximum of 2,000 ppm, preferably in an amount of from 20 to 500 ppm based on the total weight of organopolysiloxanes.

Examples of crosslinking retardants that may be used as the cure rate modifier F include so-called inhibitors for controlling the crosslinking reaction and extending the pot life of the silicone composition. Examples of advantageous crosslinking retardants that may be used as the cure rate modifier include, for example, vinylsiloxanes, 1,3-divinyltetra-methyldi siloxane, or tetravinyl-tetramethyl-tetracyclosiloxanes. It is also possible to use other known inhibitors, for example ethynylcyclohexanol, 3-methylbutynol, or dimethyl maleate.

Fillers

In some embodiments, the addition curable organopolysiloxane composition X further comprises at least one filler G. Examples of fillers that can be used in the addition curable organopolysiloxane composition X include, but are not limited to, reinforcing fillers, non-reinforcing fillers, electrically conductive fillers, thermally conductive fillers, and any combination thereof.

Compared to non-reinforcing fillers, reinforcing fillers improve the mechanical properties of the silicone compositions in which they are included. In contrast, non-reinforcing fillers act as extenders and dilute the silicone compositions.

In some embodiments, the at least one filler G is a reinforcing filler selected from silicas, aluminas and/or carbon black, preferably selected from silicas and/or carbon black.

In particular, reinforcing fillers are envisaged characterized by a fine particle size often less than or equal to 0.1 μm and a high ratio of specific surface area to weight, generally lying within the range of approximately 50 m$^2$/g and 1000 m$^2$/g (measured by the BET method to DIN 66131 and DIN 66132). Silicas of this type are commercially available products and are well known in the art of the manufacture of silicone compositions. These silicas may be colloidal silicas, silicas prepared pyrogenically (silicas called combustion or fumed silicas) or by wet methods (precipitated silicas) or mixtures of these silicas.

The chemical nature and the method for preparing silicas capable of forming the filler are not important for the purpose of the present invention, provided the silica is capable of exerting a reinforcing action on the final polymer. Cuts of various silicas may of course also be used.

These silicas have a mean particle size generally close to or equal to 0.1 μm and a BET specific surface area greater than 50 m$^2$/g, preferably between 50 and 400 m$^2$/g, notably between 150 and 350 m$^2$/g.

These silicas are optionally:
pretreated with the aid of at least one compatibilizing agent chosen from the group of molecules that satisfy at least two criteria:
have a high interaction with silica in the region of its hydrogen bonds with itself and with the surrounding silicone oil;
are themselves, or their degradation products, easily removed from the final mixture by heating under vacuum in a gas flow, and compounds of low molecular weight are preferred;
and/or treated in situ:
in a specific manner with the aid of at least one untreated silica,
and/or in a complementary manner by using at least one compatibilization agent of nature similar to that which can be used in pre-treatment and as defined above.

In situ treatment of the silica filler is understood to mean putting the filler and the compatibilizing agent in the presence of at least one portion of the preponderant silicone polymer referred to above.

The compatibilizing agent is chosen according to the treatment method (pre-treatment or in situ) and may for example be selected from the group comprising:
chlorosilanes,
polyorganocyclosiloxanes, such as octamethylcyclosiloxane (D4),
silazanes, preferably disilazanes, or mixtures thereof, hexamethyldisilazane (HMDZ) being the preferred silazane and that may be associated with divinyltetramethyl-disilazane,
polyorganosiloxanes having, per molecule, one or more hydroxyl groups linked to silicon,
amines such as ammonia or alkylamines with a low molecular weight such as diethylamine,
organic acids with a low molecular weight such as formic or acetic acids, and mixtures thereof.

In the case of in situ treatment, the compatibilizing agent is preferably used in the presence of water.

For more details in this respect, reference may be made for example to patent FR-B-2 764 894.

As a variant, it is possible to use compatibilizing methods of the prior art providing early treatment by silazane (e.g., FR-A-2 320 324) or a delayed treatment (e.g., EP-A-462 032) bearing in mind that according to the silica used their use will in general not make it possible to obtain the best results in terms of mechanical properties, in particular extensibility, obtained by treatment on two occasions according to the invention.

As a reinforcing alumina that may be used as a filler, a highly dispersible alumina is advantageously employed, doped or not in a known manner. It is of course possible also to use cuts of various aluminas. As a non-limiting examples of such aluminas, reference may be made to aluminas A 125, CR 125, D 65CR from the Baikowski Company. Preferably, the reinforcing filler used is a combustion silica, taken alone or mixed with alumina.

As regards weight, it is preferred to employ a quantity of reinforcing filler of between 0.5 and 30%, preferably between 6 and 25%, more preferably between 7 and 20% by weight based on all the constituents of the composition.

Examples of non-reinforcing fillers that may be used in the compositions of the invention include, but are not limited to, ground silica, calcium carbonate, calcium silicate, titanium dioxide, zinc oxide and any combination thereof.

The use of a complementary filler such as a thermally conductive filler and/or an electrically conductive filler may also be envisaged according to the invention.

Examples of thermally conductive fillers that may be used in the compositions of the invention include, but are not limited to, aluminum oxide, zinc oxide, aluminum nitride, metal powder, metal coated glass beads/fiber, and any combination thereof.

Examples of electrically conductive fillers that may be used in the compositions of the invention include, but are not limited to, carbon black, carbon nanotubes, graphene, graphite, metal powder, metal coated glass beads/fiber, and any combination thereof.

Silicone Resins

In some embodiments, the addition curable organopolysiloxane composition X further comprises at least one silicone resin H. In some embodiments, the at least one silicone resin H comprises at least two ethylenic unsaturations, wherein said resin reacts or is capable of reacting with component (B) via hydrosilylation. Examples of silicone resins H that may be used include, but are not limited to, resins of MQ or MDQ or MT type comprising at least one —CH=CH unsaturated reactive end.

As used herein, the nomenclature of silicone resins is represented by "MDTQ", wherein the resin is described as a function of the various siloxane monomer units it comprises, and wherein each of the letters M, D, T and Q characterizes a type of unit.

As used herein, the letter M represents the monofunctional unit of formula $(CH_3)_2SiO_{1/2}$, wherein the silicon atom is bonded to only one oxygen atom in the polymer comprising this unit.

As used herein, the letter D represents a difunctional unit $(CH_3)_2SiO_{2/2}$, wherein the silicon atom is bonded to two oxygen atoms.

As used herein, the letter T represents a trifunctional unit of formula $(CH_3)_1SiO_{3/2}$.

In the units M, D and T defined above, at least one of the methyl groups may be substituted with a group R other than a methyl group, such as a hydrocarbon-based radical, for example alkyl, comprising from 2 to 10 carbon atoms, or a phenyl group, or alternatively a hydroxyl group.

As used herein, the letter Q represents a tetrafunctional unit $SiO_{4/2}$ in which the silicon atom is bonded to four oxygen atoms, which are themselves bonded to the rest of the polymer. Examples of such resins include, but are not limited to, MT silicone resins such as poly(phenylvinylsilsesquioxane), for instance the product sold under the reference SST-3PV1 by the company Gelest.

In some embodiments, the amount of the at least one silicone resin H is from about 1% to about 95% by weight of the total weight of the addition curable organopolysiloxane composition X. In some embodiments, the amount of the at least one silicone resin H is from about 5% to about 30% by weight of the total weight of the addition curable organopolysiloxane composition X. In some embodiments, the amount of the at least one silicone resin H is from about 10% to about 50% by weight of the total weight of the addition curable organopolysiloxane composition X.

Additives

In some embodiments, the addition curable organopolysiloxane composition X further comprises at least one additive I. Examples of additives that may be used include organic dyes or pigments, stabilizers introduced in silicone rubbers in order to improve heat stability, resistance against hot air, reversion, depolymerisation under attack of traces of acids or water at high temperature. Plasticizers, or release oils, or hydrophobicizing oils, such as polydimethylsiloxane oils, without reactive alkenyl or SiH groups. Mold-release such as fatty acid derivatives or fatty alcohol derivatives, fluoroalkyl. Compatibilizer such as hydroxylated silicone oils. Adhesion promoters and adhesion modifiers such organic silanes. Adhesion catalysts, such as tetra-n-butyl titanate (TnBT or TBT) can also be used as at least one additive I.

Alkoxysilanes can be used as additive(s) in silicone compositions. Thus, in some embodiments, the at least one additive I is an alkoxysilane. In such cases, the alkoxysilane I is added to the composition separately from the at least one alkoxysilane used as the solvent D. The optional further alkoxysilane I can be one or more alkoxysilane defined herein. In some embodiments, the optional further alkoxysilane I can be selected from the group consisting of: glycidyl 3-(trimethoxysilyl)propyl ether (GLYMO), 3-glycidyloxy-propyltriethoxysilane; vinyltrimethoxysilane (VTMO), vinyltriethoxysilane, vinyltriacetoxysilane, octyltrimethoxysilane, dodecyltrimethoxysilane, hexadecyltrimethoxysilane, methyloctyldimethoxysilane, 3-methacryloxypropyltrimethoxysilane (MEMO), 3-methacryloyloxypropyltriethoxysilane, n-octyltrimethoxysilane, dodecyltrimethoxysilane, hexadecyltrimethoxysilane, methyloctyldimethoxysilane, methyltrimethoxysilane, methyltriethoxysilane, dimethyldimethoxysilane, propyltrimethoxysilane, isobutyltrimethoxysilane, phenyltrimethoxysilane, and their mixtures. In some embodiments, the polyalkoxysilicon compound is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures.

Methods

Also provided is a process for incorporating an optical brightener into a polymeric composition comprising mixing at least one optical brightener and at least one solvent to create a premix blend; and adding the premix blend to the polymeric composition.

Any optical brightener(s) described herein can be used in the process for incorporating an optical brightener into a polymeric composition. In some embodiments, the at least one optical brightener is a benzoxazole derivative. In some embodiments, the at least one optical brightener is a benzoxazole derivative selected from the group consisting of 2,5-thiophenediylbis(5-tert-butyl-1,3-benzoxazole), which is commercially available under the trade name Tinopal® OB CO from BASF, 2,2'-(vinylenedi-p-phenylene)bisbenzoxazole, 2,2'-(naphthalene-1,4-diyl)bis(benzoxazole), 2-[4-[2-[4-(benzoxazol-2-yl)phenyl]vinyl]phenyl]-5-methylbenzoxazole, and stilbene-benzoxazolines, such as 2,2'-(1,2-ethenediyl)bis(4,1-phenylene)bisbenzoxazole, which is commercially available under the trade name Benetex® OB-1 HP from Mayzo. In some embodiments, the at least one optical brightener is 2,5-thiophenediylbis(5-tert-butyl-1,3-benzoxazole) or a derivative thereof.

Any solvent suitable for dissolving the at least one optical brightener can be used in the aforementioned process for incorporating an optical brightener into a polymeric composition. The inventors of the invention have advantageously discovered that optical brighteners such as benzoxazole derivatives are highly soluble in alkoxysilanes. Thus, in some embodiments, the at least one optical brightener is mixed with at least one alkoxysilane and subsequently, the mixture of the at least one optical brightener and the at least one alkoxysilane is added to the polymeric composition. By mixing the at least one optical brightener and the at least one alkoxysilane prior to adding the at least one optical brightener to a polymeric composition, homogenous distribution of the optical brightener can be achieved. Furthermore, since alkoxysilanes are compatible with polymeric compositions such as silicone, epoxy, and polyurethane compositions, the use of alkoxysilanes as solvents for optical brighteners as described herein is unlikely to impart negative qualities that other solvents, such as flammable organic solvents, could introduce.

Preferably, the at least one solvent is a polyalkoxy-silicon compound having the structure of formula (4):

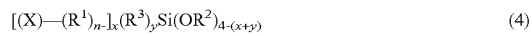

in which:
x=0, 1 or 2, preferably x=0 or 1;
y=0 or 1;
x+y=0, 1 or 2;
n=0 or 1;
$R^1$ is a linear or branched or cyclic alkylene group having 1 to 20 carbon atoms, optionally with aromatic fractions, optionally with one or more heteroatoms;
$R^2$ is an alkyl group having 1 to 5 carbon atoms;
X is a hydrogen atom or a functional group selected from the group consisting of oxirane, OH, (meth)acryloyloxy, amine, SH, acylthio, and vinyl; and
$R^3$ is selected from the group consisting of: an alkyl group having 1 to 8 carbon atoms, a mercaptoalkyl group, a $C_1$ to $C_6$ haloalkyl group, an ureidoalkyl group, a $C_2$ to $C_8$ alkenyl group, a substituted or unsubstituted aryl group, and a $C_1$ to $C_8$ alkyl comprising (meth)acrylate group.

In some embodiments, the at least one solvent is a polyalkoxy-silicon compound selected from the group consisting of glycidyl 3-(trimethoxysilyl)propyl ether (GLYMO), 3-glycidyloxy-propyltriethoxysilane; vinyltrimethoxysilane (VTMO), vinyltriethoxysilane, vinyltriacetoxysilane, octyltrimethoxysilane, dodecyltrimethoxysilane, hexadecyltrimethoxysilane, methyloctyldimethoxysilane, 3-methacryloxypropyltrimethoxysilane (MEMO), 3-meth-acryloyloxypropyltriethoxysilane, n-octyltrimethoxysilane, dodecyltrimethoxysilane, hexadecyltrimethoxysilane, methyloctyldimethoxysilane, methyltrimethoxysilane, methyltriethoxysilane, dimethyldimethoxysilane, propyltrimethoxysilane, isobutyltrimethoxysilane, phenyltrimethoxysilane, and their mixtures. In some embodiments, the polyalkoxy-silicon compound is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures.

In some embodiments, the at least one solvent is glycidyl 3-(trimethoxysilyl)propyl ether (GLYMO) or a derivative thereof.

The amount of the at least one optical brightener to be used will depend upon the amount needed to detect the optical brightener within the polymeric composition and may vary depending on the polymeric composition and/or the particular application in which it is used. in some embodiments, the amount of optical brightener included in the polymeric composition is from about 0.001% to about 0.02% by weight of the total weight of the polymeric composition; from about 0.0025% to about 0.015% by weight of the total weight of the polymeric composition; or from about 0.005% to about 0.01% by weight of the total weight of the polymeric composition.

By dispersing the optical brightener homogenously throughout the polymeric composition, less optical brightener can be used in the polymeric composition. When the optical brightener agglomerates within the polymeric composition, it is less effective because only the optical brightener on the surface of the agglomerates contribute significantly to the fluorescent effect, while the optical brighteners inside the agglomerates are not as effective due to the blockage of UV light by the surface of the agglomerates. Furthermore, if the optical brightener forms agglomerates instead of dispersing evenly throughout the composition, the relatively bright agglomerates decrease visibility of the composition as a whole. Since optical brighteners are fairly expensive, the ability to include less optical brightener within a polymeric composition is an important advantage of the invention.

The amount of solvent to be used will vary depending on the amount and type of optical brightener used. In general, a sufficient amount of solvent to substantially or completely dissolve the optical brightener can be used. In some embodiments, the amount of the at least one solvent present in the polymeric composition is from about 0.5% to about 5.0% wt. of the total weight of the polymeric composition; from about 0.75% wt. to about 3.0% of the total weight of the polymeric composition; or from about 1.0% wt. to about 2.0% of the total weight of the polymeric composition. In some embodiments, the amount of the at least one solvent present in the polymeric composition is about 1.0% wt. or less of the total weight of the polymeric composition.

The at least one optical brightener and the at least one solvent can be mixed using any suitable means. It has advantageously been shown that optical brighteners, such as benzoxazole derivatives, dissolve readily in solvents, such as alkoxysilanes, within five minutes with stirring at room temperature. Alternatively, the at least one optical brightener and the at least one solvent may be combined, optionally under nitrogen, and heated to about 50° C. with stirring. However, any suitable temperature and/or mixing conditions may be used to dissolve the at least one optical brightener in the at least one solvent.

After mixing the at least one optical brightener and the at least one solvent, the resulting mixture, which may advantageously be the premix blend described above, is added to the polymeric composition by any suitable means.

In some embodiments, the polymeric composition is selected from silicones, epoxy, epoxy copolymers, polyurethanes, acrylic polymers and copolymers, butyl rubbers, ethylene-vinyl acetate polymers, polyamides, polyester, and polyether. In some embodiments, the polymeric composition is a silicone polymer. In some embodiments, the polymeric composition is an addition curable organopolysiloxane composition, such as the addition curable organopolysiloxane composition X described herein.

Uses

Polymeric compositions of the invention find use in automatic optical inspection as a QC means in fields such as electronics and computers, functional polymeric compositions such as potting, adhesive, gasketing, sealants, coating, and encapsulating materials, are often required or preferred to comprise a UV tracer, which facilitates the detection of leakage and mis-positioning of polymeric materials during dispensing. For example, polymeric compositions of the invention may be used as a conformal coating on a printer circuit board. In other fields, such as textile coating, and with primers. UV traceability is a good method to confirm that the coating or primer has been uniformly applied on the substrate.

Polymeric compositions of the invention, such as an addition curable organopolysiloxane X described herein, have been found to exhibit excellent adhesive properties and/or minimal to no sedimentation even upon prolonged storage. Such polymeric compositions can be particularly useful as sealants and/or coatings in fields such as electronics and computers as described above.

Other advantages provided by the present invention will become apparent from the following illustrative examples.

EXAMPLES

Example 1—Solubility of Tinopal® OB CO in Various Silanes

Several different silanes and tetrabutyl titanate were tested for their ability to dissolve a commonly used optical brightener, 2,5-thiophenediylbis(5-tert-butyl-1,3-benzoxazole) (Tinopal® OB CO). The following silanes were tested: (3-Glycidyloxypropyl)trimethoxysilane (GLYMO), vinyltrimethoxysilane (VTMO), 3-(trimethoxysilyl)propyl methacrylate (MEMO), tetrabutyl titanate (TnBT or TBT), a cocktail of GLYMO+VTMO+TBT (2%+2%+0.7% by weight respectively), and a mixture (mixture A) in which the main intermediate has the following structure:

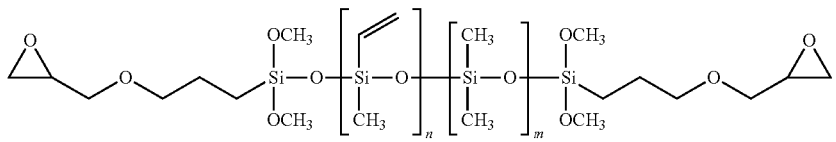

Of these silanes, GLYMO contains both alkoxy groups and glycidyloxypropyl group; VTMO and MEMO contain alkoxy groups but no glycidyloxypropyl group; and mixture A is enriched in glycidyloxypropyl groups. TnBT contains alkoxy groups but no glycidyloxypropyl group.

The conditions used to mix the samples were as follows: 0.072 g of Tinopal® OB CO was added to 10 g of the different compounds in a 20 mL Flacktek container. The samples were mixed at 3000 rpm for 45 sec for 5 times at room temperature. The samples were stored in the container (capped tight) at room temperature overnight.

One of the key criteria of determining a solvent's capability to dissolve Tinopal® OB CO is whether it forms a clear solution or a suspension. Other factors that should be considered are the amount of undissolved OBA at the bottom of the container, the brightness of the solution under black light, and the amount of OBA particle observed under black light with the naked eye. After mixing Tinopal® OB CO in each of the compounds, a drop of the mixture was sandwiched between two glass plates. The brightness of the mixture, and the amount of visible OBA particle with the naked eye under black light was recorded. Pictures were also taken for each of the samples under black light. The data is summarized below in Table 2.

TABLE 2

Solubility of Tinopal ® OB CO in different compounds

| | Forms a clear solution? | Amount of undissolved Tinopal ® OB CO | Brightness | # of particles observed |
|---|---|---|---|---|
| GLYMO | Yes | low | high | 0 |
| VTMO | Yes | low | high | 0 |
| MEMO | Yes | zero | high | 0 |
| Mixture A | No | medium | high | 40 |
| TBT | No | medium | medium | 5 |
| GLYMO + VTMO + TBT (2% + 2% + 0.7% by wt) | Yes | zero | high | 0 |

Figure 1B:
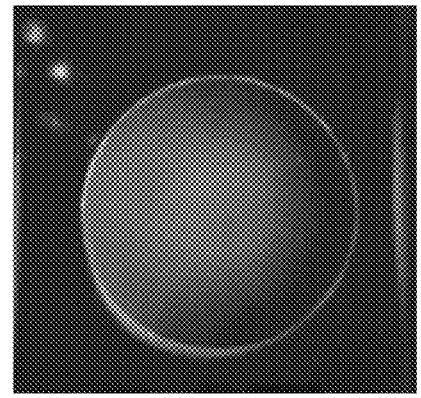
Figure 1C:
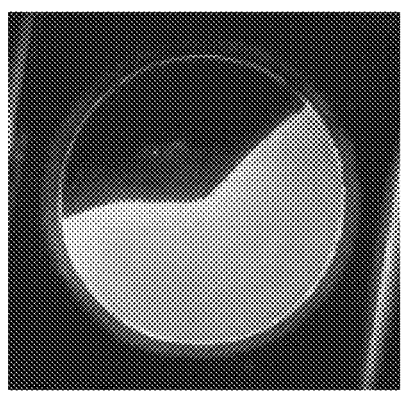
Figure 1D:
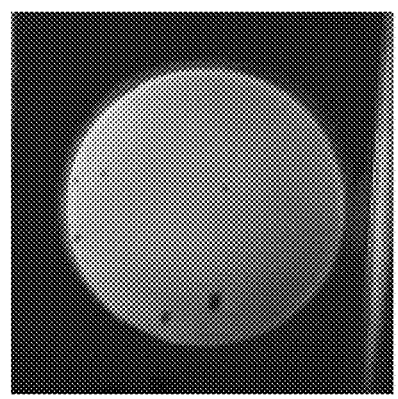
Figure 1E:
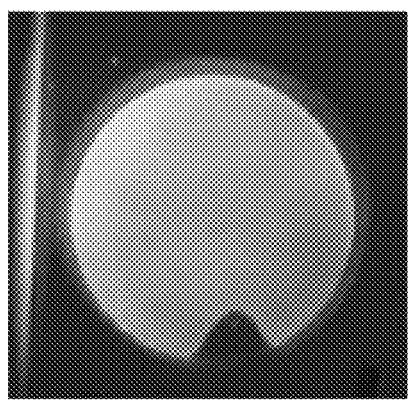

The data in Table 2 demonstrates that Tinopal® OB CO exhibits relatively good solubility in GLYMO, VTMO, MEMO, and the cocktail of GLYMO+VTMO+TBT. It is less soluble in TBT and is even less soluble in Mixture A. Pictures of the above samples are illustrated in FIG. 1. As shown in FIG. 1A, many particles of OBA can be seen (around 40 particles) when Mixture A is used as the solvent. When TBT is used to as the solvent, a few OBA particles can be observed (FIG. 1B). However, when VTMO, GLYMO, the cocktail of GLYMO+VTMO+TBT, or MEMO are used as the solvent, they form a clear solution with Tinopal® OB CO, and no particles of OBA can be observed (FIGS. 1C-E, respectively; MEMO not shown), even though there may be undissolved OBA particles at the bottom of the container. In FIG. 1D, the black dots are trapped air bubbles, not undissolved particles. It is noted that the mass/volume of the drop of mixture observed under black light was not controlled, so there may be slight variation in the amount of mixture observed between the different samples. However, it is not believed to affect the above observed trends.

As mentioned above, if glycidyloxypropyl groups are more effective to dissolve Tinopal® OB CO than alkoxy groups, Mixture A should dissolve Tinopal® OB CO better than other silanes tested due to the abundance of glycidyloxypropyl groups in Mixture A and the absence of glycidyloxypropyl groups in other silanes, i.e., MEMO and VTMO. However, Mixture A was the least effective of all solvents tested, indicating that glycidyloxypropyl group is not the determining factor for the dissolution of Tinopal® OB CO.

Compared to GLYMO, VTMO and MEMO only have alkoxy groups (methoxy groups), but not glycidyloxypropyl groups. They exhibit comparable or even better solvating capability for Tinopal® OB CO. It is thus believed that alkoxy groups (in this case, methoxy groups) are the moiety responsible for the solvation of Tinopal® OB CO.

Example 2—Solubility of Various Optical Brighteners in GLYMO

As demonstrated above, GLYMO was effective for dissolving Tinopal® OB CO. To determine if other optical brighteners can be dissolved in GLYMO, several different optical brighteners were tested for their ability to dissolve in (3-Glycidyloxypropyl)trimethoxysilane (GLYMO). In addition to Tinopal® OB CO, a stilbene derivative OBA (hexasodium-2,2'-[vinylenebis[3-sulfonato-4,1-phenylene)imino [6-(diethylamino)-1,3,5-triazine-4,2-diyl]imino]]bis(benzene-1,4-disulphonate); Tinopal® SFP), a stilbene-benzoxazoline OBA (benzoxazole, 2,2'-(1,2-ethenediyldi-4,1-phenylene)bis-; Benetex® OB-1 HP), and a biphenyl-stilbene (derivative of distyryl biphenyl (DSBP) compound; Benetex® OB-M1) were tested.

The mixing conditions and experimental procedures used were identical to those described above in Example 1. The results are shown below in Table 3.

TABLE 3

Solubility of different optical brighteners in GLYMO

| | Forms a clear solution? | Amount of undissolved optical brightener | Brightness | # of particles observed |
|---|---|---|---|---|
| Tinopal ® OB CO | Yes | low | high | 0 |
| Tinopal ® SFP | No | high | low | >300 |
| Benetex ® OB-1 HP | No | low | low | >300 |
| Benetex ® OB-M1 | No | low | low | >300 |

Figure 2A:
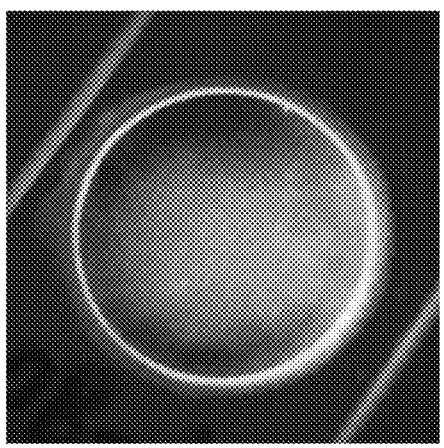
FIG. 2A-2B shows photographic images of various optical brighteners mixed with GLYMO (glycidyl 3-(trimethoxysilyl)propyl ether). A. Benetex® OB-1 HP (2,2'-(1,2-ethenediyl)bis(4,1-phenylene)bisbenzoxazole)+GLYMO. B. Benetex® OB-M1 (benzenesulfonic acid, 2,2'-([1,1'-biphenyl]-4,4'-diyldi-2,1-ethenediyl)bis-)+GLYMO.
Figure 2B:
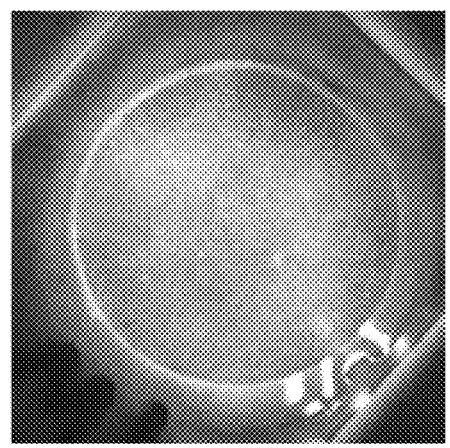

The data suggest that of the four optical brighteners tested, only Tinopal® OB CO was acceptably soluble in GLYMO. Benetex® OB-1 HP exhibits slightly better solubility in GLYMO than Benetex® OB-M1 (FIGS. 2A & 2B, respectively). However, numerous OBA particles can be observed in both samples.

Example 3—Comparison of Different Methods for Mixing Optical Brighteners in Solvent In view of the above results demonstrating that other optical brighteners were not effectively dissolved in GLYMO, different mixing conditions were explored to determine if dissolvability could be improved.

Mixing Method 1 (MM1) was identical to the methods used above in Examples 1 and 2. Mixing Method 2 (MM2) was identical to MM1 except as follows: The optical brightener and solvent are combined under nitrogen. The sample was first heated at 50° C. for 5 mins, then mixed at 3000 rpm for 45 secs, and then heated again at 50° C. for another 5 mins, and mixed at 3000 rpm for 45 secs twice, then heated again at 50° C. for 5 mins, and mixed at 3000 rpm for 2 mins.

The results obtained using both methods are shown below in Table 4.

TABLE 4

Solubility of different OBAs in GLYMO with both RT mixing (MM1) and heated mixing (MM2).

| | Form a clear solution? | | Amount of undissolved OBA | | Brightness | | # of particles observed | |
|---|---|---|---|---|---|---|---|---|
| | Mixing Method 1 | Mixing Method 2 | MM1 | MM2 | MM1 | MM2 | MM1 | MM2 |
| Tinopal® OB CO | Yes | Yes | low | Zero | high | high | zero | zero |
| Tinopal® SFP | no | No | high | Low | low | low | >300 | 10-20 |
| Benetex® OB-1 HP | no | no | low | High | low | high | >300 | >300 |
| Benetex® OB-M1 | no | no | low | low | low | low | >300 | >100 |

Heating (MM2) improved the solubility of Tinopal® OB CO in GLYMO. As a result, there were no undissolved particles. However, heating did not significantly improve the solubility of other OBAs in GLYMO.

Example 4—Saturation of Optical Brightener in GLYMO

To determine the saturation level of optical brightener in GLYMO, increasing amounts of Tinopal® OB CO were mixed with GLYMO (0.25%, 0.5%, 1.0%, 2.0%, 3.0% Tinopal® OB CO), heated at 50° C. for one hour and then cooled while mixing.

Figure 3:
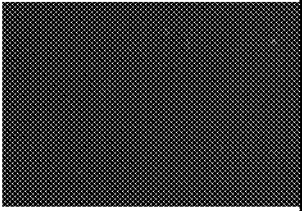
FIG. 3 shows photographic images of increasing concentrations of Tinopal® OB CO mixed with GLYMO (glycidyl 3-(trimethoxysilyl)propyl ether) and provides the average particle size of Tinopal® OB CO in each sample.
Figure 3:
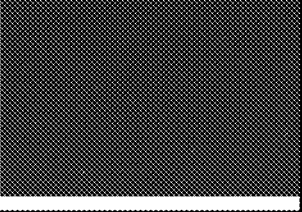
Figure 3:
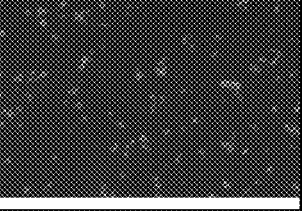
Figure 3:
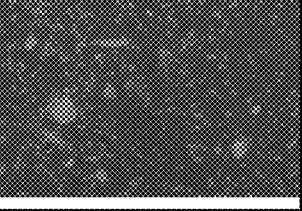
Figure 3:
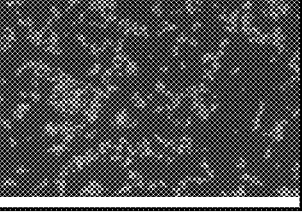

As illustrated in FIG. 3, Tinopal® OB CO was homogenously distributed when mixed with GLYMO at a concentration of less than 1.0%. Visible particles (agglomerates) of Tinopal® OB CO (average particle size of about 50 μm or greater) were present at concentrations of 1.0% or greater.

Example 5—Polymeric Compositions

An exemplary addition curable organopolysiloxane composition according to the invention is provided below in Table 5.

TABLE 5

Exemplary Composition 1 (EC1)

| Material | wt. % |
|---|---|
| Part A | |
| Silicone resin | 19.80% |
| PDMS | 55.97% |
| Minusil® 10 | 23.19% |
| Black Thermax® | 0.30% |
| TnBT | 0.70% |
| 10% Pt catalyst | 0.04% |
| Total | 100.00% |
| Part B | |
| Silicone resin | 51.69% |
| Minusil® 10 | 36.00-38.00% |
| SiH Crosslinker | 6.50-7.10% |
| VTMO | 2.00-2.20% |
| GLYMO | 2.00-2.20% |
| Tinopal® OB CO | 0.01-0.04% |
| ECH | 0.04% |
| Total | 100.00% |

The above exemplary composition (EC1) was prepared using the following steps.

Part A
1) Minusil® 10, Black Thermax®, and silicone resin were first mixed together.
2) Linear α,ω-divinyl-polydimethylsiloxane (PDMS), TnBT, 10% Pt catalyst were then added and mixed.

Part B
1) The Tinopal® OB CO was first dissolved in GLYMO at 0.5:100 by wt. (Tinopal® OB CO:GLYMO), and named as MB. MB was set aside for later use.
2) Separately, Minusil® 10 and silicone resin were first mixed together.
3) SiH Crosslinker (dimethylhydrosiloxy-terminated poly(dimethylsiloxy)(methylhydrosiloxy) copolymer; average H content=0.69% by wt.) and 1-Ethynyl-1-cyclohexanol (ECH) were then added and mixed.
4) VTMO and MB were then added and mixed.

Comparative Example

The comparative composition (CC1) was prepared as above except the process for preparing Part B was as follows.

Part B
1) Minusil® 10, Tinopal® OB CO, and silicone resin were first added and mixed.
2) SiH Crosslinker (dimethylhydrosiloxy-terminated poly(dimethylsiloxy)(methylhydrosiloxy) copolymer; average H content=0.69% by wt.) and ECH were then added and mixed.
3) VTMO and GLYMO were then added and mixed.

Figure 4A:
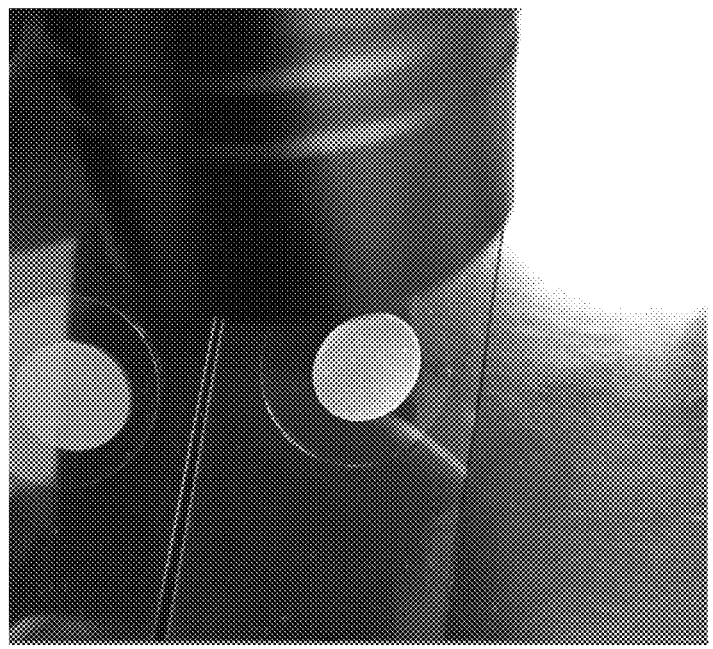
FIG. 4A-4B shows photographic images of silicone compositions containing Tinopal® OB CO under black light with no magnification. A. Silicone composition in which Tinopal® OB CO is added directly to the composition (Comparative Composition 1; CC1). B. Silicone composition in which Tinopal® OB CO is first dissolved in GLYMO prior to addition to the composition (Exemplary Composition 1; EC1).
Figure 4B:
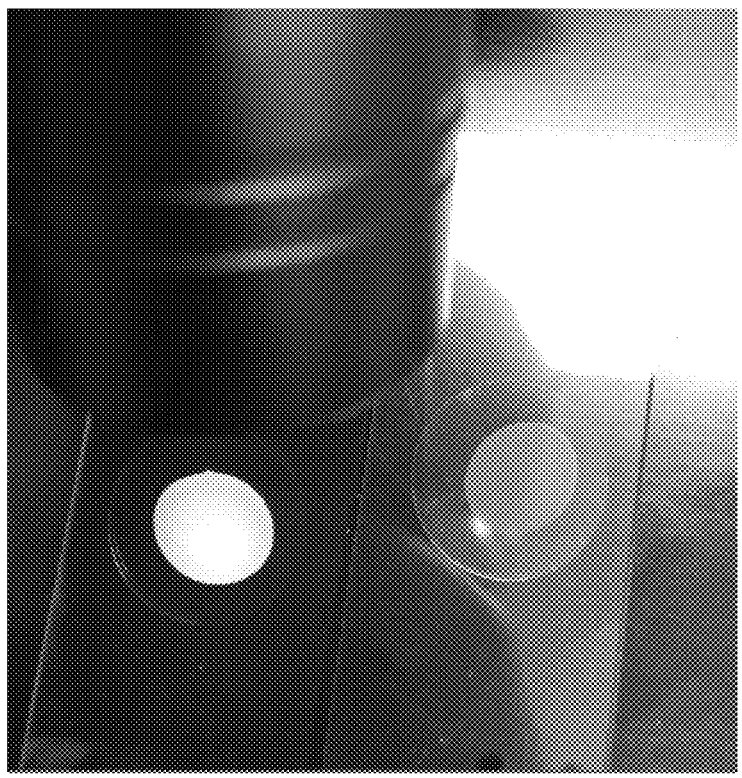
Figure 5A:
FIG. 5A-B shows microscopic images of silicone compositions containing Tinopal® OB CO under black light. A. Silicone composition in which Tinopal® OB CO is added directly to the composition (Comparative Composition 1; CC1). B. Silicone composition in which Tinopal® OB CO is first dissolved in GLYMO prior to addition to the composition (Exemplary Composition 1; EC1).
Figure 5B:
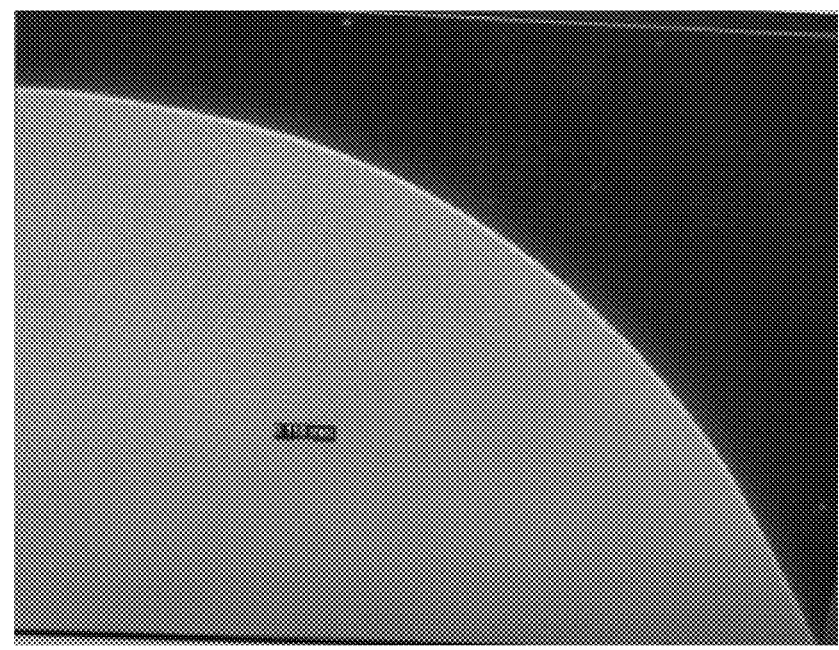

The results show that visible particles of optical brightener were seen under black light by the naked eye (FIG. 4A) or under a microscope (FIG. 5A) in the comparative example composition (CC1). In contrast, when the optical brightener is first combined with GLYMO prior to addition to the composition (EC1), there is homogeneous distribution of the optical brightener and there are no visible particles of optical brightener seen under black light either with the naked eye (FIG. 4B) or under a microscope (FIG. 5B).

The number of particles visible to the naked eye under black light without magnification were also counted. As noted above, no visible particles were present in the exemplary composition (EC1). In contrast, 30 visible particles were present in the comparative composition (CC1).

Figure 6A:
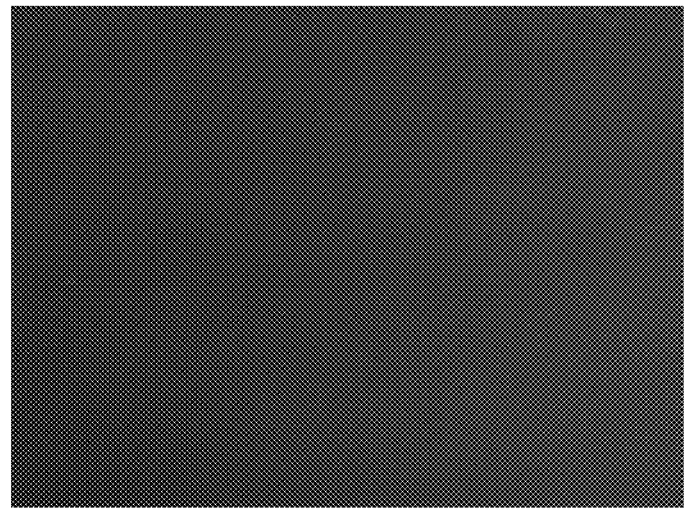
FIG. 6A-6B shows microscopic images (1.25×) of cured silicone compositions containing Tinopal® OB CO under black light. A. Silicone composition in which Tinopal® OB CO is added directly to the composition (Comparative Composition 1; CC1). B. Silicone composition in which Tinopal® OB CO is first dissolved in GLYMO prior to addition to the composition (Exemplary Composition 1; EC1).
Figure 6B:
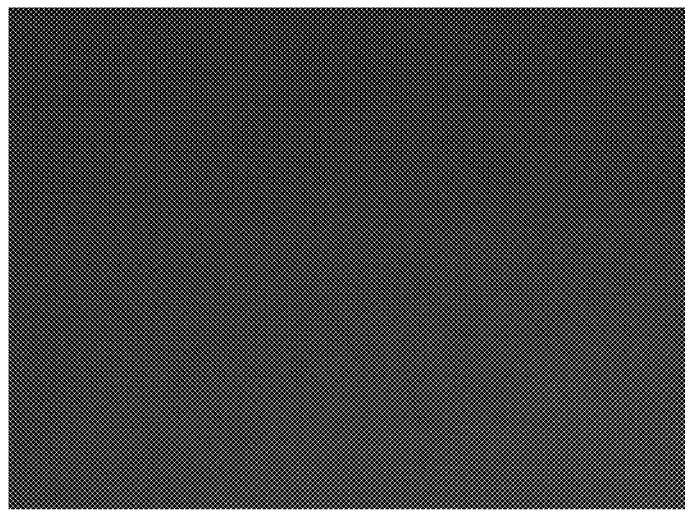

Microscopic images of cured comparative composition (CC1) and cured exemplary composition (EC1) are shown in FIGS. 6A & B, respectively. The curing conditions were 150° C. for 30 mins. As can be seen in these two pictures, optical brightener particles are visible in the cured comparative composition (CC1), but not in the exemplary composition (EC1).

Example 6—Extrusion Rate of Polymeric Compositions Prepared Using the Process of the Invention The extrusion rate of polymeric compositions prepared using the process of the invention were compared to the extrusion rate of polymeric compositions prepared by adding the optical brightener directly to the composition. Extrusion rates were measured using a dispensing nozzle with an inside diameter of 0.09 mm connected to an air hose. Each polymeric composition tested was extruded using 70 psi air pressure with 20 psi trigger pressure for 30 minutes.

The results are presented below in Table 6.

TABLE 6

| | Total grams of sample dispensed after 30 minutes | |
|---|---|---|
| % optical brightener | Powder loading (g) | Pre-mixed with GLYMO (g) |
| 0.04% | 1.85 | 1.50 |
| 0.1% | 0.70 | 1.65 |
| 0.5% | 0.57 | — |

Example 7—Stability of Two-Part Curable Systems Prepared Using the Process of the Invention Two-part curable systems (Part A and Part B) of Exemplary Composition 1 (EC1) were prepared as described above in Example 5 and stored at room temperature. Sedimentation was visible in Part A after about 4 weeks at room temperature and in Part B after about 6 weeks at room temperature.

Example 8—Physical Properties of Polymeric Compositions Prepared Using the Process of the Invention Exemplary Composition 1 was cured for either 30 minutes or 1 hour at 150° C. Peel force of the resulting cured exemplary compositions was measured using a modified ASTM D903 standard with 4 inch/minute travel rate of the grip. Adhesive failure was observed in EC1 compositions cured for 30 minutes at 150° C. Fifty percent cohesive failure was observed in EC1 compositions cured for 1 hour at 150° C. The peel force observed in EC1 compositions was 7 lb/in or 0.13 kg/mm (30 minute cure) and 11 lb/in or 0.20 kg/mm (1 hour cure). After aging for 19 weeks at room temperature, cohesive failure was lost and peel force was slightly reduced (~5 lbf/in or 0.09 kg/mm for 30 minute cured compositions and ~8 lb/in or 0.14 kg/mm for 1 hour cured compositions). Here adhesive failure is defined in this invention as interfacial bond failure between the adherend and the adhesive. Cohesive failure, on the other hand, happens when debonding allows a layer of adhesive to remain on both surfaces.

Other physical properties of EC1 compositions are provided in Table 7. Density was measured using standard ASTM 1475. Viscosity was measured using a Brookfield viscometer with a #6 spindle at 10 rpm at 25° C. Pot life is the snap-back time of the surface of the material.

TABLE 7

| Physical properties of EC1 compositions | |
|---|---|
| Density of Part A | 1.1 |
| Density of Part B | 1.3 |
| Viscosity of Part A | 19,000 mPa · s |
| Viscosity of Part B | 31,000 mPa · s |
| Shore A Hardness | 48 |
| Pot Life | >48 hrs |
| Tensile Strength | 690 psi |
| Elongation | 170% |

Example 9—Effect of Filler on Polymeric Compositions Prepared Using the Process of the Invention A further exemplary addition curable organopolysiloxane composition according to the invention (Exemplary Composition 2; EC2) was prepared similarly as described above in Example 5 for Exemplary Composition 1 except that PDMS-treated precipitated silica (Sipernat® D 10) was used as the filler instead of of Minusil® 10.

Stability and physical properties of EC2 were measured as described above in Examples 7 and 8. No sedimentation was visible in Part A or in Part B for at least six months after storage at room temperature. Furthermore, no signs of sedimentation were found in either Part A or Part B after centrifugation at 3500 rpm for 70 minutes.

No adhesive failure was observed in EC2 compositions cured for 30 minutes or 1 hour at 150° C. One hundred percent cohesive failure was observed in EC2 compositions cured for 30 minutes or 1 hour at 150° C. The peel force observed in EC2 compositions was 9 lb/in or 0.16 kg/mm (30 minute cure) and 10 lb/in or 0.18 kg/mm (1 hour cure). After aging for 25 weeks at room temperature, cohesive failure remained at 100% and peel force was also maintained at approximately 9 lb/in or 0.16 kg/mm in EC2 compositions cured for either 30 minutes or 1 hour at 150° C.

Other physical properties of EC2 compositions were measured as described in Example 8 and are provided in Table 8.

TABLE 8

| Physical properties of EC2 compositions | |
|---|---|
| Density of Part A | 1.0 |
| Density of Part B | 1.1 |
| Viscosity of Part A | 15,000 mPa · s |
| Viscosity of Part B | 25,000 mPa · s |
| Shore A Hardness | 42 |
| Pot Life | >72 hrs |
| Tensile Strength | 690 psi |
| Elongation | 260% |

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

We claim:

1. An addition curable organopolysiloxane composition X comprising:
   a) at least one organopolysiloxane A having at least two alkenyl groups bonded to silicon per molecule, said alkenyl groups each containing from 2 to 14 carbon atoms,
   b) at least one silicon compound B having at least two hydrogen atoms bonded to silicon per molecule,
   c) at least one addition reaction catalyst C, and
   d) at least one optical brightener E dissolved in at least one solvent D, wherein the at least one solvent D is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures.

2. The addition curable organopolysiloxane composition X according to claim 1 wherein the at least one optical brightener E is a benzoxazole derivative.

3. The addition curable organopolysiloxane composition X according to claim 1, wherein the at least one optical brightener E dissolved in at least one solvent D is a premix blend comprising:
   a) at least one solvent D selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures, and
   b) at least one optical brightener E, wherein the at least one optical brightener E is a benzoxazole derivative.

4. The addition curable organopolysiloxane composition X according to claim 1, wherein the optical brightener E has the following formula (2):

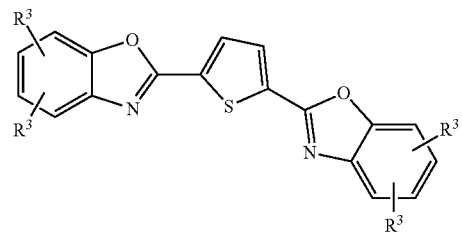

(2)

in which $R^3$, independently, is a hydrogen atom, $-C(CH_3)_3$, a $C_1$ to $C_{30}$ alkyl group, or $-CO(O-R^4)$ in which $R^4$ is a $C_1$ to $C_{30}$ alkyl group.

5. The addition curable organopolysiloxane composition X according to claim 1, wherein the optical brightener E has the following formula (3):

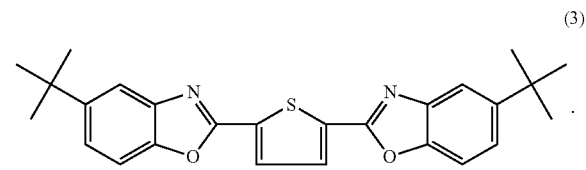 [SMILES: CC(C)(C)c1ccc2oc(-c3ccc(-c4nc5cc(C(C)(C)C)ccc5o4)s3)nc2c1]

(3)

6. A process for incorporating an optical brightener E into a silicone polymeric composition comprising:
   a) mixing at least one optical brightener E and at least one solvent D to create a premix blend, wherein the at least one solvent is selected from the group consisting of glycidyl 3-(trimethoxysilyl)propyl ether (GLYMO), vinyltrimethoxysilane (VTMO), 3-methacryloxypropyltrimethoxysilane (MEMO), and their mixtures; and
   b) adding the premix blend to the silicone polymeric composition.

7. The process according to claim 6, wherein the at least one optical brightener E is a benzoxazole derivative.

8. The process according to claim 6, wherein the at least one optical brightener E has the following formula (2):

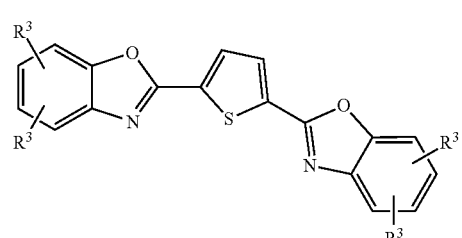

(2)

in which $R^3$, independently, is a hydrogen atom, $-C(CH_3)_3$, a $C_1$ to $C_{30}$ alkyl group, or $-CO(O-R^4)$ in which $R^4$ is a $C_1$ to $C_{30}$ alkyl group.

9. The process according to claim 6, wherein the at least one optical brightener E has the following formula (3):

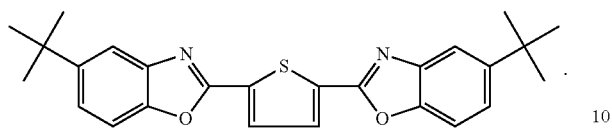
(3)

10. The process according to claim 6, wherein the silicone polymeric composition is an addition curable organopolysiloxane composition X.

11. A cured organopolysiloxane composition obtained by curing the addition curable organopolysiloxane composition X according to claim 1.

12. A polymeric composition obtained by the process according to claim 6.

13. An adhesive composition comprising the addition curable organopolysiloxane composition X according to claim 1.

* * * * *